United States Patent [19]

Suzuki

[11] Patent Number: 5,623,629
[45] Date of Patent: Apr. 22, 1997

[54] APPARATUS FOR MAINTAINING COHERENCY OF CACHE MEMORY DATA

[75] Inventor: Toshiaki Suzuki, Kanagawa-ken, Japan

[73] Assignee: Mitsubishi Denki Kabushiki Kaisha, Tokyo, Japan

[21] Appl. No.: 323,501

[22] Filed: Oct. 14, 1994

Related U.S. Application Data

[63] Continuation of Ser. No. 741,661, Aug. 6, 1991, abandoned.

[30] Foreign Application Priority Data

Aug. 8, 1990 [JP] Japan ................................. 2-209663

[51] Int. Cl.$^6$ ..................................................... G06F 12/00
[52] U.S. Cl. .......................................... 395/468; 395/473
[58] Field of Search .................................... 395/468, 473

[56] References Cited

U.S. PATENT DOCUMENTS

| | | | |
|---|---|---|---|
| 4,802,085 | 1/1989 | Levy et al. ............................... | 395/375 |
| 5,067,078 | 11/1991 | Talgam et al. ........................... | 395/400 |
| 5,072,369 | 12/1991 | Theus et al. ............................. | 395/425 |
| 5,136,691 | 8/1992 | Baror ....................................... | 395/200 |
| 5,136,700 | 8/1992 | Thacker ................................... | 395/400 |
| 5,150,469 | 9/1992 | Jouppi ..................................... | 395/375 |
| 5,195,089 | 3/1993 | Sindhu et al. ........................... | 370/85.1 |
| 5,214,767 | 5/1993 | Wanner et al. ........................... | 395/425 |

OTHER PUBLICATIONS

High Performance 32-Bit Cache Controller, Intel Corporation Oct., 1987, pp. 5-11.
MC68040: 32-Bit Microprocessor User's Manual, Motorola Inc., 1989, pp. 7-1 through 7-19.
I-486 Microprocessor, Intel Corp., pp. 2-9 and 78-83 and 88-89 and 116-119, 1991 but orginally published in 1989.

*Primary Examiner*—William M. Treat
*Attorney, Agent, or Firm*—Wolf, Greenfield & Sacks, P.C.

[57] ABSTRACT

A data processor for maintaining coherency of data in a cache memory. The processor includes two memory-data-coherency maintaining devices and an operation mode changing device for changing a combination of operation modes of the maintaining devices, thereby enabling one kind of data processor to be adaptable to a plurality of different system structures and optimum memory-data-coherency to be maintained.

33 Claims, 6 Drawing Sheets

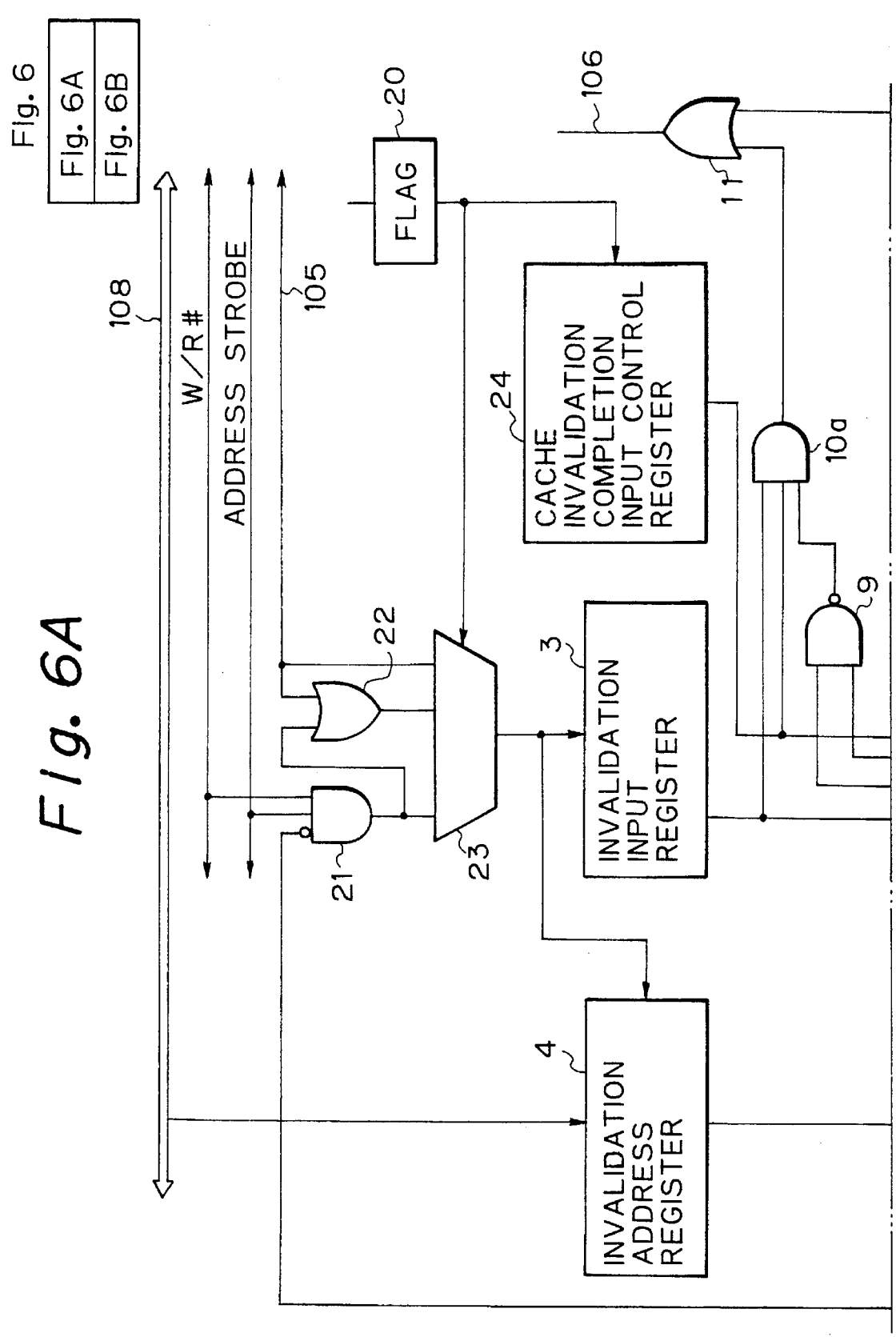

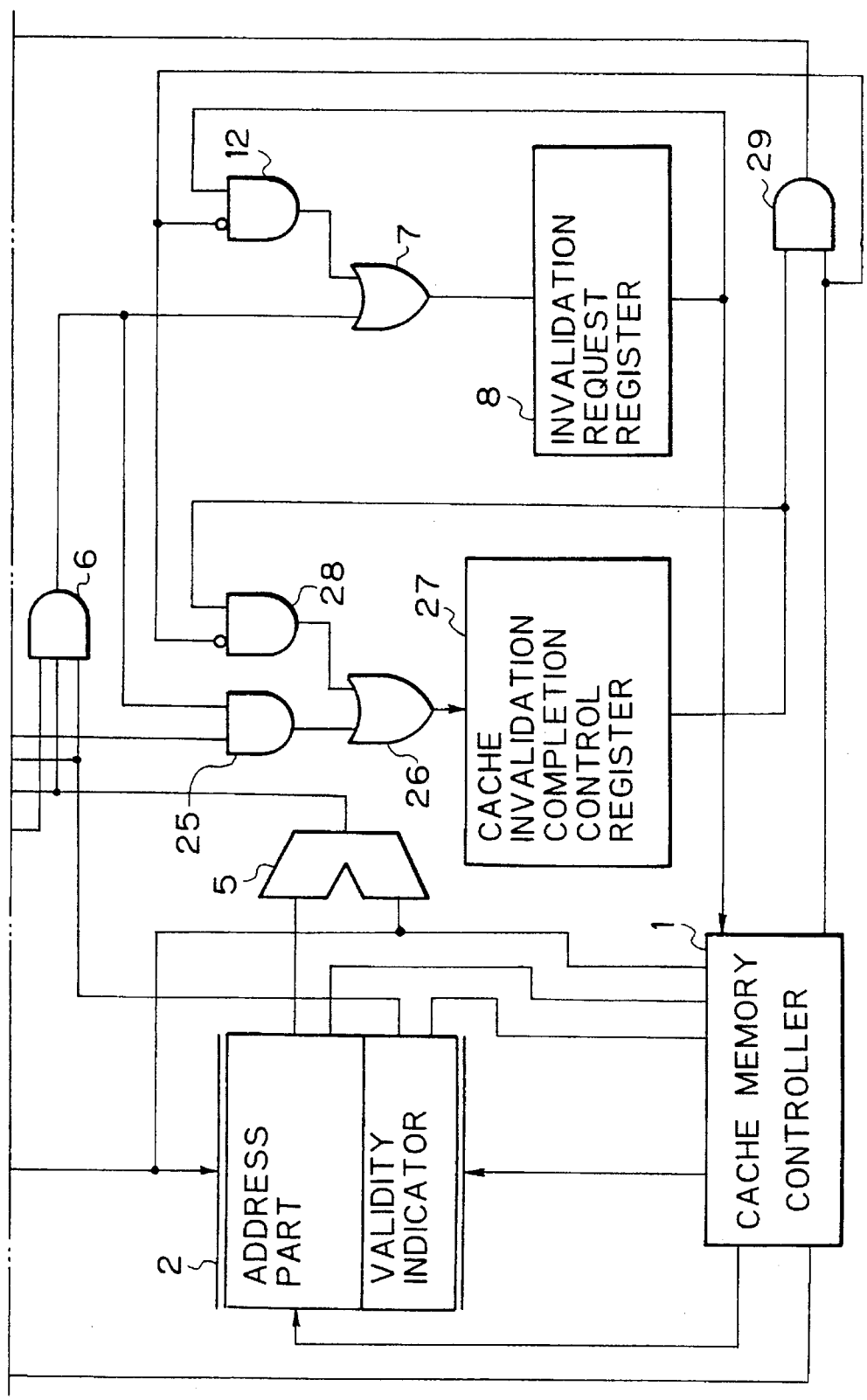

APPARATUS FOR MAINTAINING COHERENCY OF CACHE MEMORY DATA

This application is a continuation of application Ser. No. 07/741,661, filed Aug. 6, 1991, now abandoned.

BACKGROUND OF THE INVENTION

1. Field of the Invention

The present invention relates to a data processor having a cache memory, and particularly to a system for reserving coherency of data stored in main memory and data stored in the cache memory.

2. Prior Art

FIG. 1 is a system structure diagram for explaining an operation for maintaining coherency of memory data in a conventional data processor having a cache memory. In this figure, system I comprises a first processor 100 which executes data processing, a main memory 101 and a second processor 102 which executes data processing sharing the main memory 101 with the first processor 100. The processor 100 comprises a cache memory 103 which stores a copy of the contents of the main memory 101 by maintaining the contents with the store-through method for data processing. The first processor 100 and the main memory 101 are connected with a first memory bus 104a, while the second processor 102 and the main memory 101 are connected with a second memory bus 104b. When the processor 102 operates to cause its contents to be stored in the main memory 101, a cache invalidation request signal 105 for requesting invalidation of cache memory 103 is transmitted and completion of the cache invalidating operation by the first processor 100 is notified by a cache invalidation completion signal 106.

FIG. 2 is a logical diagram showing passive invalidation of a store-through cache in a conventional data processor. In this figure, a data processor comprises a cache memory controller 1 which includes a data array in the cache memory 103 and processes a cache memory access from the first processor 100 and a cache memory invalidation request; a tag memory 2 which comprises an address part and a validity indicating part which indicates that memory data corresponding to the address part exists in the cache memory, in order to control, for each cache block, registration of memory data held in the data array within the cache memory controller 1; an invalidation input register 3 which receives a cache invalidation request signal 105 when the second processor 102 requests the main memory 101 to store data; an invalidation address register 4 which receives a cache memory invalidation request address from the first memory bus 104a simultaneously with reception of the cache invalidation request signal 105 by the invalidation input register 3; and an invalidation address comparator 5 which compares the contents of the address part read from the tag memory 2 with the contents of the invalidation address register 4 excluding the address part in the cache block and the address part used for reading the tag memory 2, so as to detect coincidence between those contents. The reference numerals 6, 10, 12 denote AND gates; 9, a NAND gate; 7, 11, OR gates and 8, an invalidation request register for sending an invalidation request to the cache memory controller 1 on the basis of the fact that the cache memory invalidation request address held in the invalidation address register 4 exists in the cache memory 103.

FIG. 3 is a structural diagram of a system for explaining operations for maintaining coherency of memory data in a cache memory of another conventional data processor. In this figure, a system II comprises a first processor 200, a main memory 201, a second processor 102 and a cache memory 103. The first processor 200 and the second processor 102 are connected through a common memory bus 104 for the purpose of getting access to the main memory 201. FIG. 4 is a logical diagram for actively, namely, positively executing invalidation of the store-through type cache memory 103 within the first processor 200 of the system structure shown in FIG. 3. In FIG. 4, the first processor 200 comprises a cache memory controller 1, a tag memory 2, an invalidation input register 3, an invalidation address register 4, an invalidation address comparator 5, AND gates 6, 12, 21, an OR gate 7 and an invalidation request register 8 and is connected as shown in the figure.

Next, an operation for maintaining coherency of memory data in the data processor of the system I will be explained with reference to FIG. 1 and FIG. 2. When the second processor 102 sends a data storing request through the second memory bus 104b to the main memory 101, the main memory 101 updates the contents in accordance with the storing request. If, at the time of the update of data, a copy of the main memory 101 including old memory data to be updated are stored in the cache memory 103 in the first processor 100, it is required to maintain coherency (consistency) of data so that the first processor 100 should not use data not renewed after data has been updated. For this purpose, the main memory 101 sends a cache invalidation request address and a cache invalidation request signal 105 via the first memory bus 104a to the first processor 100 so that a copy of memory data in the cache memory 103 corresponding to the store request issued by the second processor 102 is invalidated. In the first processor 100, the cache invalidation request address is received by the invalidation address register 4 through the first memory bus 104a, while the cache invalidation request signal 105 is received by the invalidation input register 3, respectively. Next, with the output of the invalidation address register 4, the tag memory 2 is accessed to read out the address part and validity indicating part which indicate the situation of registration with regard to a relevant cache block. The address part read from the tag memory 2 is input to the invalidation address comparator 5 and is compared with the content of the invalidation address register 4 excluding the address part to be used to read the tag memory 2 and the address part within the cache block. When the address part coincides with the address part in the invalidation address register as a result of the comparison explained above, the invalidation address comparator 5 outputs a logical 1, and, when these do not coincide, the comparator 5 outputs a logical 0. The validity indicating part indicates whether the data of the cache block corresponding to the invalidation address register 4 and read from the tag memory 2 has been registered validly, and becomes a logical 1 when the data has been registered and a logical 0 when not registered. When three conditions, (1) the invalidation input register 3 outputs a logical 1, namely, the cache invalidation request exists; (2) the output of the invalidation address comparator is a logical 1, namely, the invalidation address coincides with the memory address held by the cache block in the cache memory 103; and (3) a value of the validity indicating part read from the tag memory 2 is a logical 1, namely, the cache memory 103 holds a copy of the main memory 101, are established, the AND gate 6 opens and outputs a logical 1 and thereafter the OR gate 7 opens and outputs a logical 1, thereby putting the invalidation request register 8 in a set condition. On the other hand, when the AND gate 6 opens, the output of NAND gate 9 becomes a logical 0, closing the AND gate 10. Therefore, the OR gate 11 which generates the cache invalidation completion signal 106 does not open. If a copy does not exist in the cache memory 103 when the invalidation input register 3 is in a set condition, namely, when the invalidation address comparator 5 outputs a logical 0 due to no coincidence or when the validity indicating part read from the tag memory 2 is in a logical 0 state which indicates no data has been registered, the AND gate 6 does not open and the signal which places the invalidation request register 8 in a set condition through the OR gate 7 is not generated.

On the other hand, since the NAND gate 9 opens and outputs a logical 1, the AND gate 10 opens and outputs the cache invalidation completion signal 106 through the OR gate 11.

Subsequently, the request for invalidating the data in the cache memory 103 set by the invalidation request register 8 and the cache invalidating address held in the invalidation address register 4 are input to the cache memory controller 1. Upon reception of the request from the invalidation request register 8, the cache memory controller determines priority between access requests to the cache memory 103, accepts the request by the invalidation request register 8 when there is no any other request having higher priority than the cache memory invalidating request, writes the tag memory 2 to put the validity indicating part to a logical 0 state, that is, a non-registered state using the content of the invalidation address register 4, and outputs an invalidation completion message. With the invalidating completion message output from the cache memory controller 1, the OR gate 11 opens and outputs the cache invalidation completion signal 106. Moreover, with the invalidation completion message, the AND gate 12 is closed and outputs a logical 0, thereby clearing the invalidation request register 8.

The main memory 101 which has received the cache invalidation completion signal 106 terminates the processing of writing the store requested data from the processor 102 at a relevant address.

When the second processor 102 reads data from the main memory 101 through the second memory bus 104b, the cache invalidation request signal 105 sent to the first processor 100 is not asserted. Therefore, no cache invalidating operation is initiated in the first processor 100. This operation is common in the following operation and therefore an explanation thereof will be omitted.

Next, with reference to FIG. 3 and FIG. 4 an operation for maintaining coherency of memory data in the data processor of the system II will be explained. The second processor 102 puts a store request on the common memory bus 104 and sends the request to the main memory 201. At the same time, the processor 2 drives a logical 1 indicating to store data by a W/R# signal representing a data transfer direction, that is, whether data is to be stored or fetched, the W/R# signal existing on the common memory bus 104. Next, memory address information in the store request is placed in the common memory bus 104 and the second processor 102 asserts an address strobe signal in order to transfer the memory address information to the main memory 201. When this address strobe signal is asserted, the main memory 201 receives the information in the common memory bus 104 as a store address. At this time, since the W/R# signal is a logical 1, the address strobe signal is asserted in a logical 1 state, and the cache memory controller 1 outputs a logical 0 indicating that the controller is not using the common memory bus 104, the AND gate 21 opens and outputs a logical 1. The logical 1 output from the AND gate 21 is set in the invalidation input register 3 and causes the store address from the second processor 102 on the common memory bus 104 to be sampled and stored in the invalidation address register 4.

Subsequently, the invalidation address comparator 5 and the AND gate 6 decide, by reading the tag memory 2, if a corresponding copy of data of the main memory 201 at the address sampled in the invalidation address register 4 is stored in the cache memory 103, and, when the copy exists in the cache memory 103, the cache memory controller 1 executes an invalidating operation. These operations are the same as those performed in the system I and therefore an explanation of such operations is omitted here.

It is noted that the only a difference between FIG. 4 and FIG. 2 is that cache invalidation completion is not notified to the main memory 201. That is, when the store request of the second processor 102 passes through the common memory bus 104, the first processor 100 can terminate the cache invalidating operation by monitoring traffics of the bus 104, and accordingly the invalidating operation completion need not be notified.

Since conventional data processors are structured such as explained above, if a system structure is different, an operation for maintaining coherency of a cache memory also becomes different. Therefore, different logical structures must be employed, which prevents common use of a processor and forces a new development of processors for each system structure. These changes in system structures have been insufficient. Moreover, in the case where a system structure having a double layered cache is employed, all traffics of a common memory bus must be transferred to a processor bus, resulting in a danger of lowering the performance of a system.

SUMMARY OF THE INVENTION

The present invention has been proposed to solve the problems explained above and it is therefore an object of the present invention to provide a data processor which flexibly deals with any change in a system structure for the purpose of maintaining coherency of memory data in a data processor comprising a cache memory, and suppresses any slow down in system performance by means of a coherency maintenance operation.

In view of achieving this object, a data processor according to the present invention comprises a main memory, a main processor including a cache memory and a plurality of subprocessors all interconnected through a bus, and, when any one of the subprocessors have stored data at a predetermined address in the main memory, operates to invalidate the data stored at the address of the cache memory corresponding to the predetermined address so as to maintain coherency of data of the cache memory.

The main processor comprises, in order to maintain coherency of data stored in the cache memory, (1) a first means for detecting that any one of the subprocessors have stored data to the main memory to actively monitor whether valid data is held or not at the cache memory corresponding to the address of the stored data so as to invalidate the stored data when valid data is held, (2) a second means for receiving a cache invalidating signal when any one of the subprocessors have stored data in the main memory to obtain the stored data and for passively monitoring whether valid data is being held or not at the cache memory corresponding to the obtained address so as to invalidate the held data when valid data is held, and (3) a third means for selectively operating the first means, second means or both.

In view of achieving the object of the present invention, a data processor according to the present invention may also comprise a cache memory control system, a main processor, a cache memory, a main memory and a plurality of subprocessors all interconnected through a bus, and, when any one of the subprocessors have stored data at a predetermined address in the main memory or the cache memory, operates to invalidate the data stored at the address of the cache memory corresponding to the predetermined address so as to maintain coherency of data of the cache memory.

The cache memory control system comprises, in order to maintain coherency of data stored in the cache memory, (1) a means for storing an operation mode, said operation mode corresponding to the particular system structure of the data processor, (2) a first means for detecting that any one of the subprocessors have stored data to the cache memory to actively monitor whether valid data is held or not at the cache memory corresponding to the address of the stored data cache memory corresponding to the address of the stored data so as to invalidate the stored data when valid data is held, (3) a second means for receiving a cache invalidating signal when any one of the subprocessors have stored data in the main memory, to receive the address of the stored data, and for passively monitoring whether valid data is being held or not at the cache memory corresponding to the received address so as to invalidate the held data when valid data is held, and (4) a third means for selectively operating the first means, second memos or both, based on the operation mode.

A data processor in the present invention is capable of realizing a variety of system structures using one type of data processor (for example, formed by a single LSI) and also enhancing utility of a data processor because an operation for reserving coherency can be changed only by setting an operation mode selected out of several operation modes for maintaining coherency of memory data by a selecting means without changing the system logic. Moreover, any drop of system performance can be minimized because an optimum operation node for mainlining coherency can be selected.

BRIEF DESCRIPTION OF THE DRAWINGS

FIGS. 6A and 6B a logic diagram for executing invalidation processing of a store-through type cache memory in the data processor shown in FIG. 5.

DETAILED DESCRIPTION OF THE PREFERRED EMBODIMENTS

A preferred embodiment of the present invention will be explained with reference to the accompanying drawings.

Figure 1:
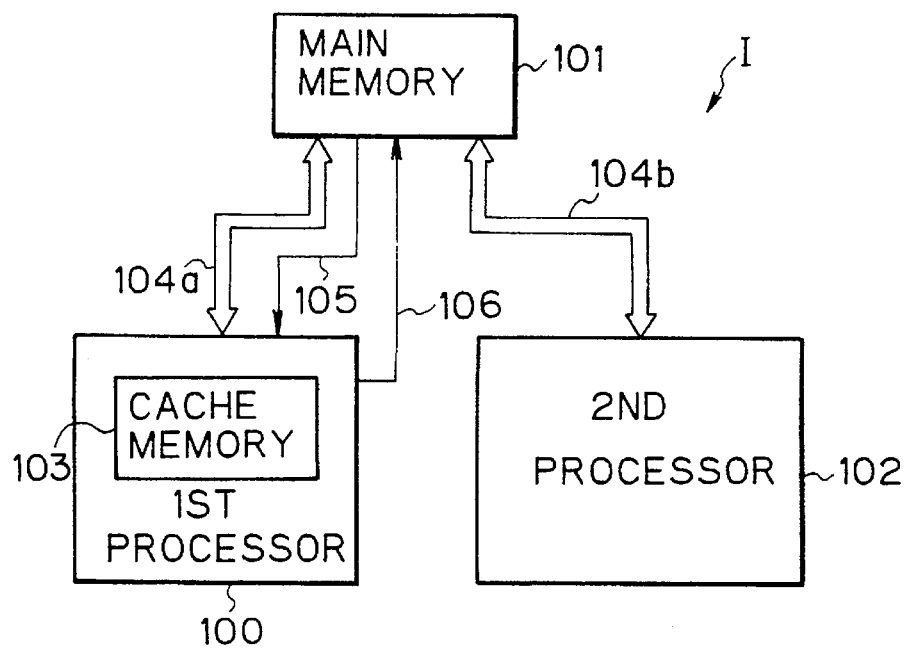
FIG. 1 is a structural diagram of a system explaining an operation for maintaining coherency of memory data in a conventional data processor having a cache memory.
Figure 3:
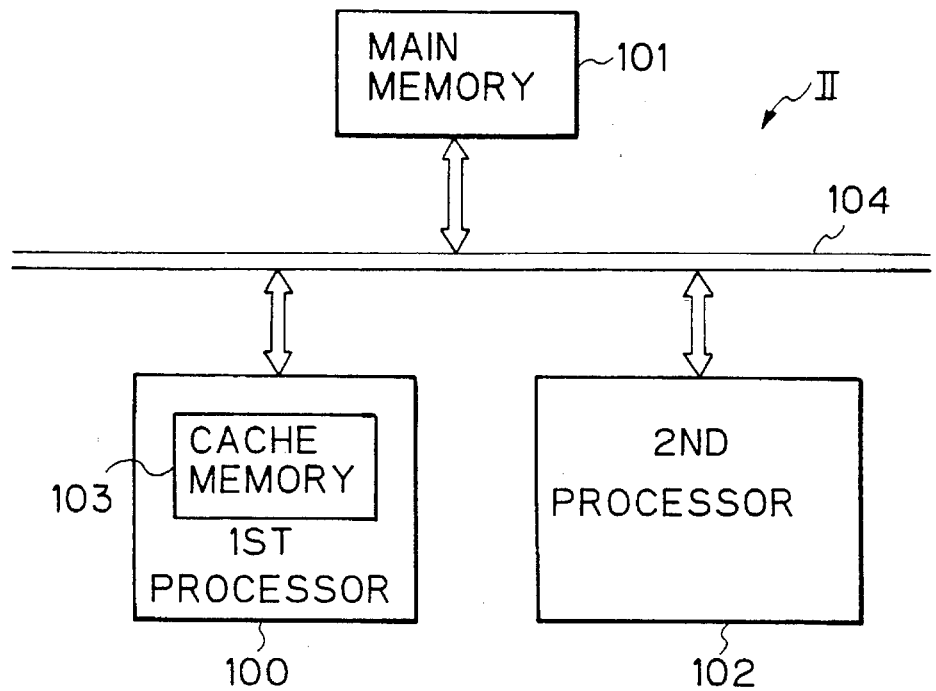
FIG. 3 is a structural diagram of a system explaining an operation for maintaining coherency of memory data in another conventional data processor having a cache memory.
Figure 5:
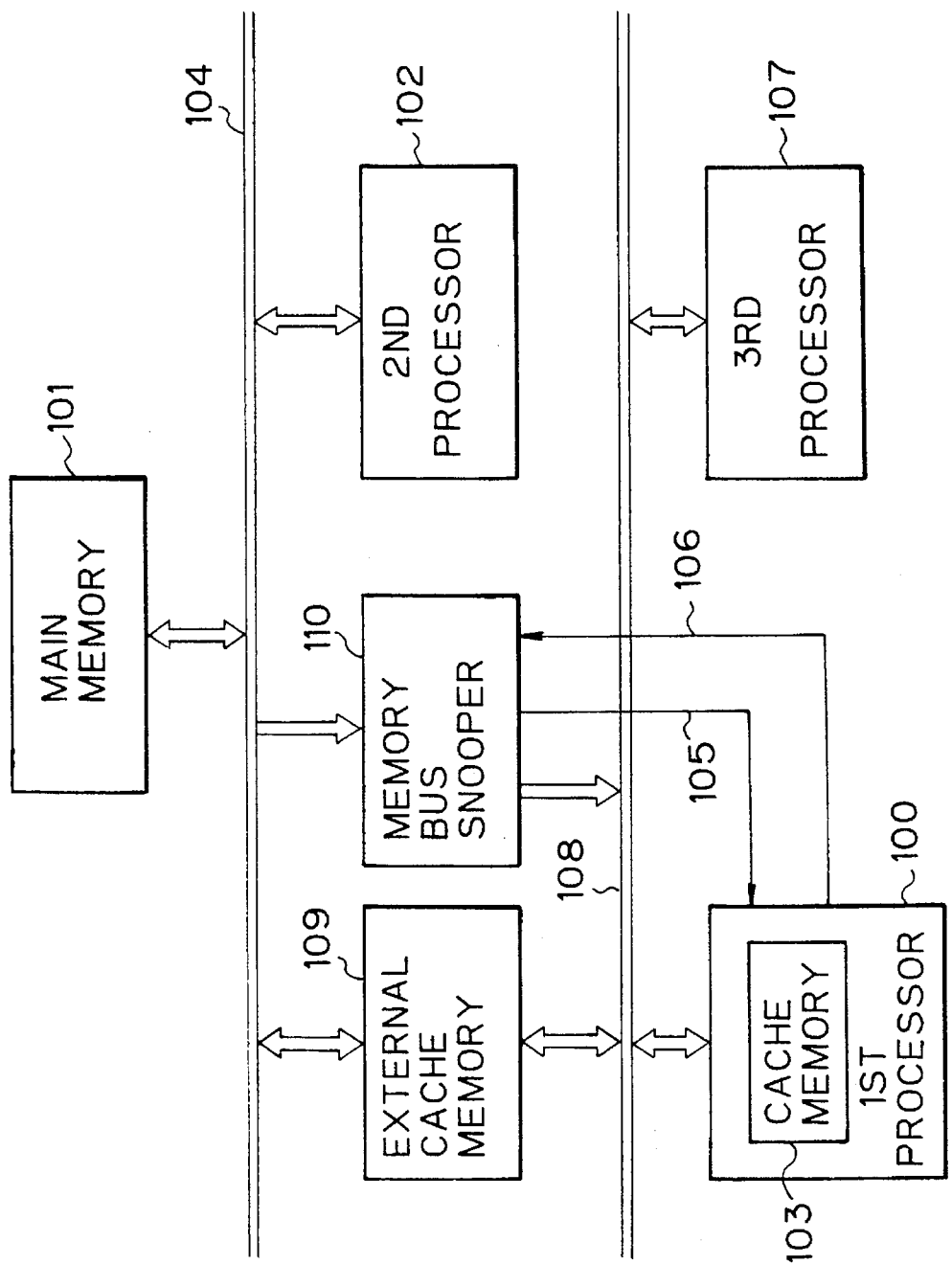
FIG. 5 is a structural diagram of a system explaining an operation, for reserving coherency of memory data in a conventional data processor according to an embodiment of the present invention.

FIG. 5 is a structural diagram of a system for explaining an operation for maintaining coherency of memory data in a data processor having a cache memory, according to the present invention. In this figure, elements similar to those in FIG. 1 and FIG. 3 are designated by the same reference numerals and explanations about these elements will be omitted here.

A data processor of the present invention further comprises a third processor 107 which executes data processing using the main memory 201 in common with the first processor 300 and the second processor 102; a processor bus 108 which is used to pass memory address and data when the first processor 300 and third processor 107 make access to the main memory 201 and to transmit memory address information when the cache memory 103 is requested to be invalidated; a store-through type external cache memory 109 which is used by the first processor 300 and the third processor 107 to store a copy of the main memory 201; and a memory bus snooper 110 which monitors access from the second processor 102 to the main memory 201 via the common bus 104 and transmits, when a store request is generated, a cache invalidation request signal 105 and an invalidation request address to the first processor 300 through the processor bus 108.

Figure 2:
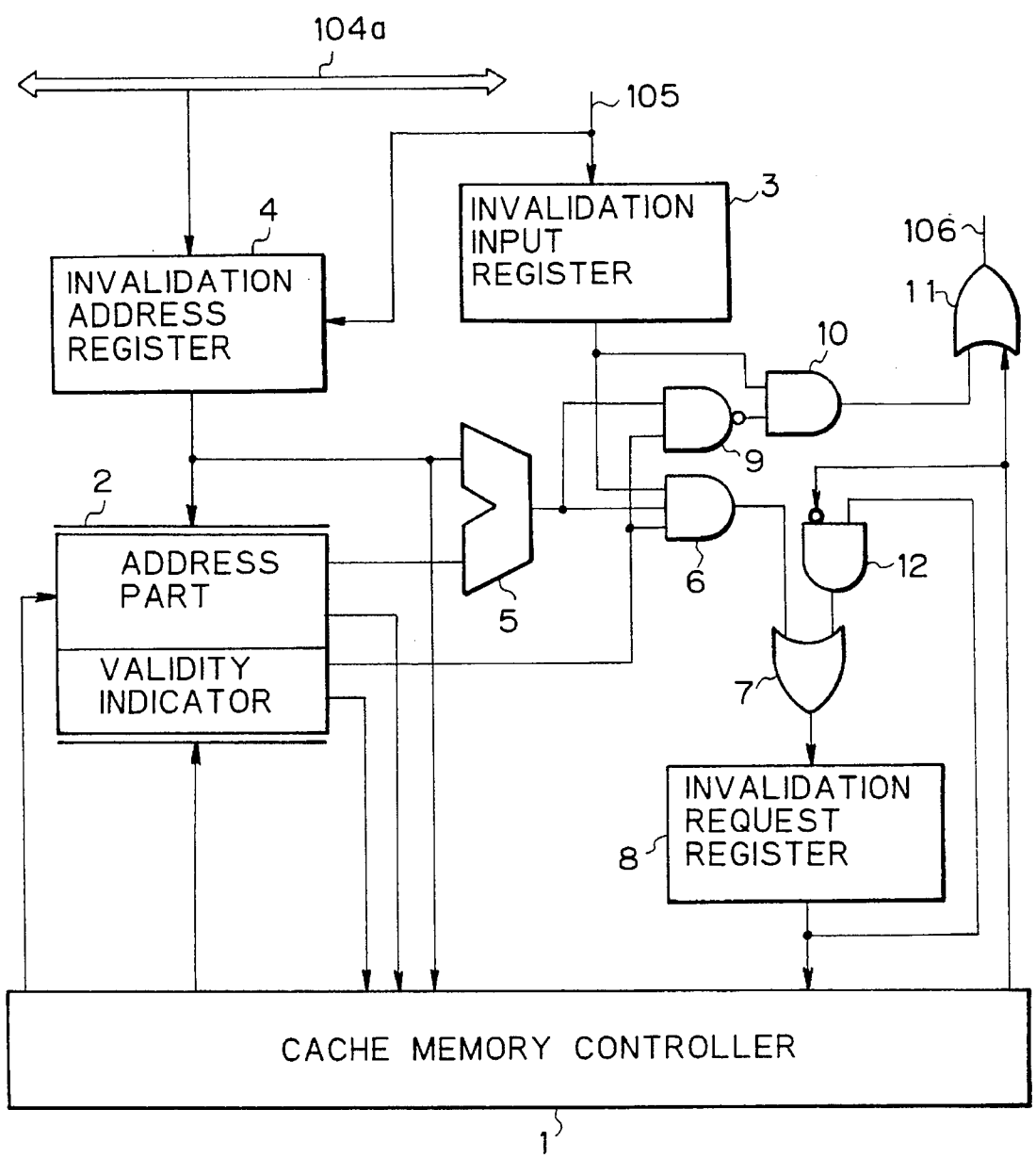
FIG. 2 is a logic diagram for passive invalidation processing in a data processor structured as shown in FIG. 1.
Figure 4:
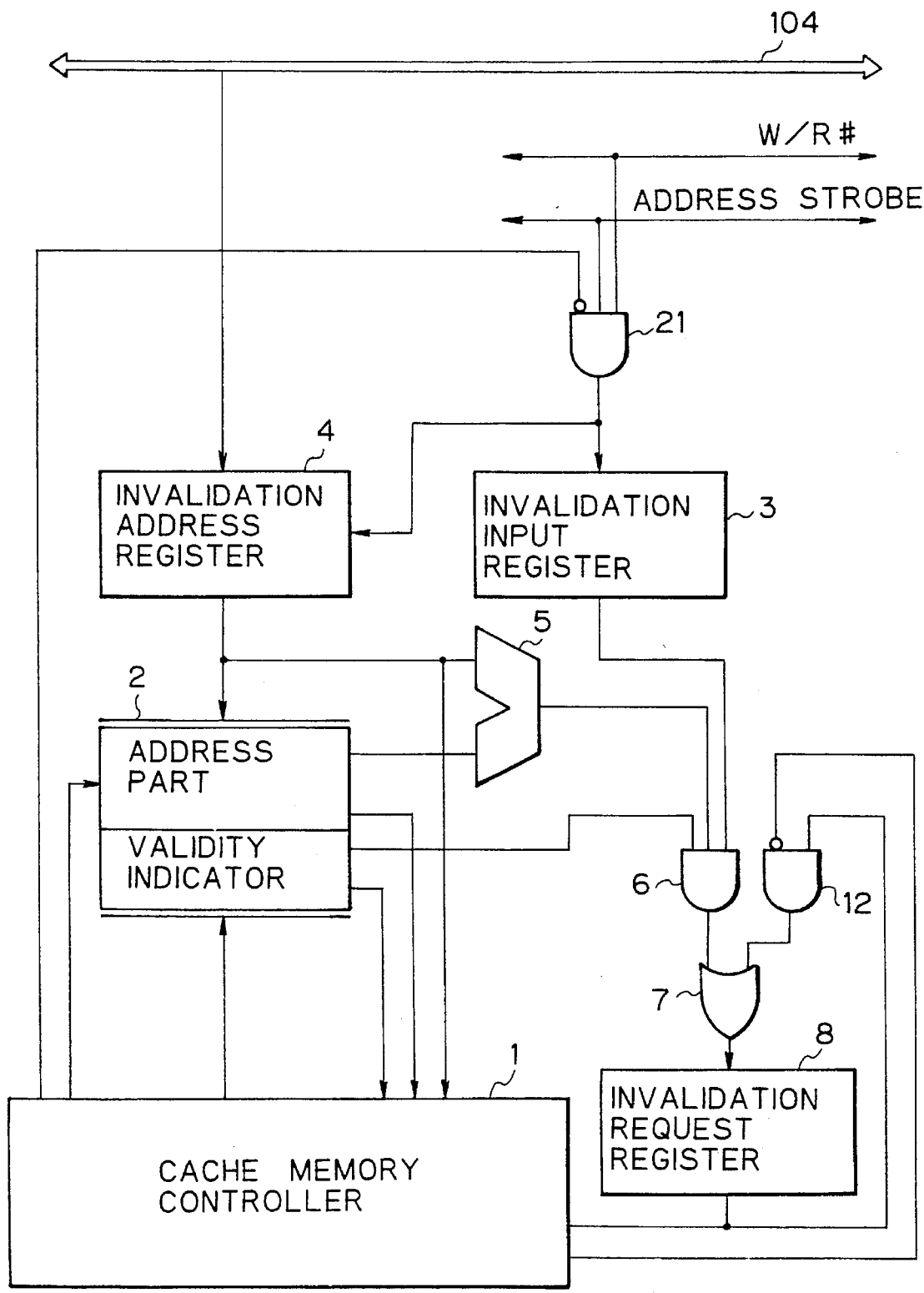
FIG. 4 is a logical diagram for active (intentional) invalidation processing in a data processor structured as shown in FIG. 3.

FIG. 6 is a logical diagram for invalidating the store-through type cache memory 103 in the data processor according to the present invention. In this figure, the elements similar to those indicated in FIG. 2 and FIG. 4 are denoted by the same reference numerals and these elements will not be explained here.

The first processor 300 further comprises a coherency operation mode flag (hereinafter referred to as "flag") 20 for controlling an operation mode to maintain coherency of memory data in the cache memory 103; a selector 23 for selecting a kind of invalidation request input to the cache memory 103 based on the content of the flag 20; a cache invalidation completion input control register 24 for controlling a cache invalidation completion signal 106; and an invalidation completion control register 27 for controlling the cache memory controller 1 to cause a cache invalidation completion signal 106 to be output when the cache memory 103 is to be invalidated on the basis of the content of the cache invalidation completion input control register 24.

Next, the operation of this embodiment will be explained. A logical structure within the processor 100 shown in FIG. 6 are applicable, depending on the content of flag 20, not only to the system structure of FIG. 5 but also to the system structure of FIG. 1 and to the system structure of FIG. 3.

(1) Operation In the system structure I of FIG. 1

In this case, the operation is similar to the operation explained with reference to FIG. 1 and FIG. 2 and therefore only a difference from the prior art will be explained. Here, the memory bus 108 shown in FIG. 6 corresponds to the first system bus 104a in FIG. 1.

Prior to commencement of the system operation, an operation mode corresponding to the system structure of FIG. 1 is set in the flag 20. The preset content enables selection of a cache invalidation request signal 105 as the output of selector 23 and has such a value as to cause the cache invalidation request signal 105 to be input to the cache invalidation completion input control register 24.

After the commencement of the system operation under this condition, when the second processor 102 transmits a store request to the main memory 101 through the second memory bus 104b, the main memory 101 updates stored data in response to the store request. With the update of data, the main memory 101 sends a cache memory invalidation request address to the main processor 100 through the first memory bus 104a and drives the cache invalidation request signal 105 to a logical 1. In the first processor 100, the cache invalidation request signal 105 is set to the invalidation input register 3 and cache invalidation completion input control register 24 through the selector 23. Simultaneously, the invalidation request address on the first memory bus 104a is set to the invalidation address register 4. Thereafter, as explained above, it is decided using the tag memory 2, invalidation address comparator 5 and AND gate 6 whether a copy of data of the main memory 101 at the address sampled to the invalidation address register 4 is being held in the cache memory 103 or not. If such a copy exists in the cache memory 103, the invalidation request register 8 is set, and thus the cache memory controller 1 executes such an invalidating operation as explained previously. If it is proved that a copy of data does not exist in the cache memory as a result of decision made by reading the tag memory 2 when the invalidation input register 3 is set, the AND gate 9 opens. At this time, since a cache invalidation completion input control register 24 is set with the cache invalidation request signal 105 and outputs a logical 1 under the control of the flag 20, the AND gate 10a opens and outputs a logical 1. As a result, the cache invalidation completion signal 106 is output through the OR gate 11 and the completion of invalidation processing is informed to the main memory 101.

When a copy of memory data to be invalidated exists in the cache memory 103, the completion of invalidation is reported such as explained hereunder. When the output of the logic gate 6 is set to a logical 1, the invalidation request register 8 is set to a logical 1 through the OR gate 7. Simultaneously, since the cache invalidation completion input control register 24 is set to a logical 1, the AND gate 25 opens and outputs a logical 1 whereby a logical 1 is set in the invalidation completion control register 27 through the OR gate 26. The invalidation completion control register 27 set to 1 is kept at the level of logical 1 by the AND gate 28 and the OR gate 26 until the cache memory controller 1 completes invalidation of the cache memory 103.

The cache memory controller 1, receiving an invalidation request from the invalidation request register 8, outputs a logical 1 to execute invalidation processing and opens the AND gate 29. Accordingly, a cache invalidation completion signal 106 is output to the main memory 101 through the OR gate 11. Simultaneously, the AND gates 12, 28 are closed thereby clearing the invalidation request register 8 and the invalidation completion control register 27.

(2) Operation in the system structure II shown in FIG. 3

Among the operation of this case, what was already explained with reference to FIG. 3 and FIG. 4 and the operation already explained in the paragraph 1 as a part of the operation of the present invention are not explained here for simplicity. The memory bus 104 in FIG. 3 corresponds to the memory bus 108 in FIG. 6.

Prior to the start of system operation, an operation mode corresponding to the system structure of FIG. 3 is set in the flag 20. This preset content has a value to select the output of the AND gate 21 as the output of the selector 23 and control the cache invalidation completion input control register 24 so that the main memory 201 does not receive the cache invalidation request signal 106. As explained above, when the flag 20 is set, a logical 0 is always set in the cache invalidation completion input control register 24, whereby, the AND gate 25 is closed and the invalidation completion control register 27 is set to a logical 0 through the OR gate 26. Since the cache invalidation completion input control register 24 is set to a logical 0, the AND gate 10a is closed and outputs a logical 0. Moreover, since the invalidation completion control register 27 is set to a logical 0, the AND gate 29 is closed and outputs a logical 0. Accordingly, the cache invalidation completion signal 106 output through the OR gate 11 remains set at a logical 0.

After the flag 20 has been set, a system operation starts. The second processor 102 places a store request address to the main memory 201 in the common memory bus 104 and sets the W/R# signal to a logical 1. Next, the second processor 102 drives an address strobe signal to a logical 1 in order to sample the store request to the main memory 201. In this case, the main memory 201 receives the store request address and W/R# signal from the memory bus 104 and starts a storing operation. Simultaneously, in the first processor 100, the AND gate 21 opens and outputs a logical 1. This output is selected by the selector 23 depending on the value set in the flag 20, whereby a logical 1 is set in the invalidation input register 3 and an invalidation request address is set in the invalidation address register 4. Thereafter, as explained previously, it is decided whether a copy of memory data corresponding to the invalidation request address has been registered to the cache memory 103 or not. When the copy has been registered, the registered data is invalidated. However, as explained above, the only difference is that the flag 20 is set so as to drive a cache invalidation completion signal 106.

(3) Operation in the system structure of FIG. 5

Prior to the start of a system operation, an operation mode corresponding to the system structure of FIG. 5 is set in the flag 20. This preset content has a value to select the output of the OR gate 22 as the output of the selector 23 and input a cache invalidation request signal 105 to the cache invalidation completion input control register 24.

After a system operation is started under this condition, the following operations are executed for the purpose of maintaining coherency of the cache memory 103 in the first processor 300.

3-1 Operation when the second processor 102 makes an access to the main memory 201

In the case the second processor 102 has issued a store request through the common memory bus 104 to the main memory 201, the external cache memory 109 and the memory bus snooper 110 simultaneously monitor independently the existence of a store request on the memory bus 104, and, when the external cache memory 109 holds therein a copy of the data of the main memory 201, the external memory 109 invalidates such copy. Meanwhile, the memory bus snooper 110 transmits an interruption to the processor bus 108 and outputs a memory address corresponding to the store request sent from the second processor 102 to the processor bus 108 as a cache invalidation request address and set a cache invalidation request signal 105 to a logical 1. In the first processor 300, since the cache invalidation request signal 105 is a logical 1, the OR gate 22 opens and outputs a logical 1. This output is selected by the selector 23 depending on the value preset in the flag 20 in accordance with the operation mode to set the invalidation input register 3, and the invalidation address register 4 receives the cache invalidation request address from the processor bus 108. Moreover, the cache invalidation request signal 105 is input to the cache invalidation completion input control register 24 to set it to a logical 1 under the control of the value preset in the flag 20. Thereafter, as was already explained in the paragraph (1), the cache memory 103 is invalidated and the cache invalidation completion signal 106 is output.

3-2 Operation executed when the third processor 107 accesses the main memory 201

When the third processor 107 outputs a store request to the external cache memory 109 through the processor bus 108 for the purpose of making access to the main memory 201, the first processor 300 opens the AND gate 21 In accordance with the same operation as that explained in the paragraph (2). The output of the OR gate 22 sets the invalidation input register 3 through the selector 23, and the invalidation address register 4 receives a store address as a cache invalidation request address. The subsequent operations are the same as those explained in paragraph (2). A cache invalidation completion signal 106 is not output, because the cache invalidation request signal 105 is not asserted in this case.

The operations explained in paragraphs 3-1 and 3-2 are serialized and do not compete with each other in the main processor 300 because the right to use the processor bus 108 is exclusively taken. Therefore, even in such a system structure as shown in FIG. 1, coherency of memory data can be correctly reserved.

In the above embodiment, a store-through cache has been employed for the cache memory 103 in the main processor 300 and the external cache memory 109 for simplifying the explanation, but even in the case the store-in cache is employed, a similar advantage as that of this embodiment can be obtained.

Moreover, a data processor using a cache memory is disclosed in Japanese Patent Public Disclosure No. 233537/ 1989, but this processor is intended to provide means for selectively setting/resetting an operation corresponding to any one of application purposes (for data and for instruction) of a cache memory, and is different in operation and advantage from the apparatus disclosed in the present invention in that a plurality of modes of operation for maintaining a match between a copy of memory data (regardless of data and instruction) in the cache memory and memory data within the main memory, that is, an invalidation of a buffer of maintenance of data coherency, and for designating/ cancelling an operation more selectively or in combination.

Japanese Patent public Disclosure No. 217283/1984 also discloses an apparatus which is intended to enhance utility of system by enabling a change in structure of a memory system by providing means for setting/resetting a processing mode of memory storing operation (store) in a store-in type cache memory which is used in common by a plurality of access request apparatus (for example, CPU), but such a disclosed apparatus is different from the present invention in object, construction and advantages.

What is claimed is:

1. A main processor to be used in a data processor system having a main memory, and at least one subprocessor, said main memory and said at least one subprocessor being interconnected through a bus network having at least a first bus, said main processor connected to said first bus and comprising:

a cache memory, first means for detecting a store request on said first bus to store data in said main memory at a memory address, said means for detecting providing a first output upon such detection;

second means for receiving a cache invalidating signal, said means for receiving providing a second output upon such reception;

means for selecting said first output, said second output or both, said means for selecting being responsive to an operation mode; and means for invalidating an entry of said cache memory at a cache address corresponding to said memory address if the entry holds valid data, said means for invalidating being responsive to the means for selecting.

2. The main processor as set forth in claim 1, wherein said first means includes means for receiving a write signal, and an address strobe signal.

3. The main processor as set forth in claim 1, wherein said operation mode is stored as a flag and and said means for selecting includes a multiplexer receiving said first and said second outputs and a logical OR combination of said first and second outputs, said multiplexer being driven by said flag to output one of the received signals.

4. The main processor as set forth in claim 1, further comprising means for providing a cache invalidation completion signal when the cache memory is invalidated and when said means for selecting is operating in response to the operation mode corresponding to the means for receiving.

5. The main processor as set forth in claim 4, wherein said means for providing a cache invalidation completion signal comprises a cache invalidation completion input control register and a cache invalidation completion control register.

6. The main processor as set forth in claim 5, wherein said data processor system includes an external cache memory, a memory bus snooper, and a second bus, wherein said main memory is connected to said second bus, and wherein the external cache memory and the second bus, and wherein said memory bus snooper is connected to said first bus and said second bus, and wherein said means for receiving receives said cache invalidation signal from said memory bus snooper.

7. The main processor as set forth in claim 1, wherein said data processor system includes an external cache memory, a memory bus snooper, and a second bus, wherein said main memory is connected to said second bus, and wherein the external cache memory is connected to the first bus and the second bus, and wherein said bus snooper is connected to said first bus and said second bus, and wherein said means for receiving receives said cache invalidation signal from said memory bus snooper.

8. The main processor as set forth in claim 7, further comprising means for providing a cache invalidation completion signal when the cache memory is invalidated and when said means for selecting is operating in response to the operation mode corresponding to the means for receiving.

9. The main processor as set forth in claim 8, wherein said first means includes means for receiving a write signal, and an address strobe signal.

10. A data processor for maintaining coherency of cache memory data, including a main memory, a main processor including a cache memory, and at least one subprocessor, and a bus network having at least a first bus interconnecting said main memory, said main processor and said at least one subprocessor, wherein said main processor is connected to said first bus and comprises:

first means for detecting a store request on said first bus to store data in said main memory at a memory address so as to provide a first cache invalidating signal;

second means for receiving a second cache invalidating signal from said main memory when said subprocessor transmits a store request to store data in said main memory at a memory address;

means for selecting a signal from one of said first cache invalidation signal, said second cache invalidating signal and a combination of said first and second cache invalidating signals, said means for selecting being responsive to an operation mode; and means responsive to the selected signal for monitoring whether valid data is held at a cache address of said cache memory corresponding to the memory address and for invalidating data at said cache address of the cache memory.

11. The data processor as set forth in claim 10, wherein said first means includes means for receiving a write signal, an address strobe signal and a cache memory controller signal, and means for providing an output signal.

12. The data processor as set forth in claim 10, wherein said means for selecting includes a coherency operation mode flag and a multiplexer receiving said first and second cache invalidating signals and wherein said combination of said first and second signals is a logical OR combination, said multiplexer being driven by said flag to output one of the received signals.

13. The data processor as set forth in claim 12, further comprising means operative when said second cache invalidating signal is selected for providing a cache invalidation completion signal when the cache memory is invalidated.

14. The data processor as set forth in claim 13, wherein said means for providing a cache invalidation completion signal comprises a cache invalidation completion input control register and a cache invalidation completion control register.

15. The data processor as set forth in claim 14, further comprising a second subprocessor, an external cache memory, a memory bus snooper, and a second bus, wherein said main memory, external cache memory, memory bus snooper and second subprocessor are interconnected by said second bus, and wherein said external cache memory is also connected to said first bus, and said second means for receiving receives said cache invalidation signal from said memory bus snooper.

16. The data processor as set forth in claim 15, wherein said memory bus snooper comprises means for monitoring access from one of said subprocessors to the main memory and transmits said cache invalidation signal when the subprocessor stores data in the main memory.

17. The data processor as set forth in claim 10, further comprising a second subprocessor, an external cache memory, a memory bus snooper, and a second bus, wherein said main memory external cache memory, memory bus snooper and second subprocessor are interconnected by said second bus, and wherein said external cache memory is also connected to said first bus, and said second means for receiving receives said cache invalidation signal from said memory bus snooper.

18. The data processor as set forth in claim 17, wherein said memory bus snooper comprises means for monitoring access from one of said subprocessors to the main memory and transmits said cache invalidation signal when the subprocessor stores data in the main memory.

19. The data processor as set forth in claim 18, wherein said means for selecting includes a coherency operation mode flag and a multiplexer receiving said first and second cache invalidating signals and said combination of said first and second signals and driven by said flag to output one of the received signals.

20. The data processor as set forth in claim 18, further comprising means operative when said second cache invalidating signal is selected for providing a cache invalidation completion signal when the cache memory is invalidated.

21. The data processor as set forth in claim 20, wherein said means for providing a cache invalidation completion signal comprises a cache invalidation completion input control register and a cache invalidation completion control register.

22. A main processor to be used in a data processor system having a main memory, and at least one subprocessor, said main memory and said at least one subprocessor being interconnected through a bus network having at least a first bus, said main processor connected to said first bus and comprising:

a cache memory;

first means for detecting a store request on said first bus to store data in said main memory at a memory address, said means for detecting providing a first signal upon such detection;

second means for receiving a cache invalidating signal, said means for receiving providing a second signal upon such reception;

means for defining an operation mode, the operation mode having a plurality of states corresponding to configurations of the data processor system;

means for selecting, having data inputs, a control input for controlling selection of the data inputs, and an output, the means for selecting receiving the first signal, the second signal, and a logical OR combination of the first and second signals as the data inputs;

means for coupling the operation mode to the control input to cause the means for selecting to select a particular data input according to the configuration of the data processor system as indicated by the operation mode;

means for invalidating an entry of said cache memory at a cache address corresponding to said memory address if the entry holds valid data, the means for invalidating being initiated by the output of the means for selecting.

23. The main processor as set forth in claim 22, wherein said first means includes means for receiving a write signal, and an address strobe signal.

24. The main processor as set forth in claim 22, wherein said operation mode is stored as a flag and said means for selecting includes a multiplexer receiving said first and said second signals and a logical OR combination of said first and second signals, said multiplexer being driven by said flag to output one of the received signals.

25. The main processor as set forth in claim 22, further comprising means for providing a cache invalidation completion signal when the cache memory is invalidated and when said means for selecting is operating in response to the operation mode corresponding to the means for receiving.

26. The main processor as set forth in claim 25, wherein said means for providing a cache invalidation completion signal comprises a cache invalidation completion input control register and a cache invalidation completion control register.

27. The main processor as set forth in claim 22, wherein said data processor system includes an external cache memory, a memory bus snooper, and a second bus, wherein said main memory is connected to said second bus, and wherein the external cache memory is connected to the first bus and the second bus, and wherein said bus snooper is connected to said first bus and said second bus, and wherein said means for receiving receives said cache invalidation signal from said memory bus snooper.

28. The cache memory control system of claim 22, wherein the store request detector has a first input connected to a write signal and a second input connected to an address strobe signal.

29. The cache memory control system of claim 25, further comprising:
- a cache invalidation completion input control register, having an input connected to the output of the flag register and an output indicative of the operation mode; and
- a cache invalidation completion control register, having an input connected to the cache memory controller and an output indicative of a completion of a cache memory invalidation sequence; and
- an OR gate having a first input connected to the output of the cache invalidation completion input control register, and a second input connected to the output of the cache invalidation completion control register, having as an output a cache invalidation completion signal.

30. The cache memory control system of claim 22, wherein the main memory has as an output the first cache invalidation signal that is activated when a store request is generated.

31. The cache memory control system of claim 22, wherein said data processing system further includes an external cache memory connected to the first bus, and a second bus connected to the main memory, the cache memory control system further comprising:
- a bus snooper, having an output connected to the first bus, and an input connected to the second bus, and having as a further output the first cache invalidation signal that is activated when a store request is generated on the first bus.

32. A cache memory control system, to be used in a data processing system having a main processor, a cache memory, a main memory, and at least one subprocessor interconnected by a first bus, said cache memory control system comprising:
- a flag register in which an operation mode is stored, having as an output an operation mode signal;
- a store request detector, having inputs connected to the first bus, and having an output providing a store request signal that is activated when a store request is generated on said first bus;
- a selection circuit, having a first input connected to the output of the flag register, a second input connected to the output of the store request detector, and a third input connected to a first cache invalidation signal, the selection circuit having as an output one of the store request signal, the first cache invalidation signal, and a logical OR combination of the store request signal and the cache invalidation signal; and
- a cache memory controller, connected to the first bus and the cache memory, having an input connected to the output of the selection circuit, and having as an output a signal indicating invalidation of an entry of the cache memory at a cache address when the cache memory at the cache address has been updated.

33. A cache memory control system, to be used in a data processing system having a main processor, a cache memory, a main memory, and at least one subprocessor interconnected by a first bus, said cache memory control system comprising:
- a flag register in which an operation mode is stored, having an input that receives an operation mode input signal and an output that provides an operation mode control signal;
- a store request logic gate, having a first input that receives a write signal from the first bus, a second input that receives an address control signal from the first bus, and an output that provides a store request signal that is activated when the write signal and the address control signal indicate that a store request is generated on the first bus;
- a combination logic gate, having first input that receives the store request signal from the store request logic gate, a second input that receives a first cache invalidation signal, and an output that provides a logical OR combination of the store request signal and the cache invalidation signal;
- a selection circuit, having a control input connected to the output of the flag register, a first data input connected to the output of the store request logic gate, a second data input connected to the second input of the combination logic gate to receive the first cache invalidation signal, a third data input connected to the output of the combination logic gate, and an output that provides one of the store request signal, the first cache invalidation signal, and the logical OR combination of the store request signal and the cache invalidation signal, the output of the selection circuit being determined by the operation mode control signal provided by the output of the flag register; and
- a cache memory controller, connected to the first bus and the cache memory, having an input connected to the output of the selection circuit, and having as an output a signal indicating invalidation of an entry of the cache memory at a cache address when the cache memory at the cache address has been updated.

* * * * *